(12) United States Patent
Nesbitt et al.

(10) Patent No.: US 8,856,276 B2
(45) Date of Patent: Oct. 7, 2014

(54) METHOD, SYSTEM AND PROGRAM PRODUCT FOR COLLECTING WEB METRIC DATA

(75) Inventors: Richard E. Nesbitt, Holly Springs, NC (US); Brian M. O'Connell, Cary, NC (US); Herbert D. Pearthree, Cary, NC (US); Kevin E. Vaughan, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 2005 days.

(21) Appl. No.: 11/432,070

(22) Filed: May 11, 2006

(65) Prior Publication Data

US 2007/0266145 A1 Nov. 15, 2007

(51) Int. Cl.
*G06F 15/16* (2006.01)
*G06F 17/30* (2006.01)

(52) U.S. Cl.
CPC .................................. *G06F 17/3089* (2013.01)
USPC .......................................... 709/218; 709/224

(58) Field of Classification Search
CPC ............................. H04I 67/22; H04L 12/2602
USPC .................................................. 709/218, 224
See application file for complete search history.

(56) References Cited

U.S. PATENT DOCUMENTS

| | | | | | |
|---|---|---|---|---|---|
| 4,811,278 | A | * | 3/1989 | Bean et al. | 711/111 |
| 5,452,455 | A | * | 9/1995 | Brown et al. | 713/100 |
| 6,018,619 | A | * | 1/2000 | Allard et al. | 709/224 |
| 6,223,231 | B1 | * | 4/2001 | Mankude | 710/38 |
| 6,275,846 | B1 | * | 8/2001 | Kondo et al. | 709/200 |
| 6,813,635 | B1 | * | 11/2004 | Jorgenson | 709/225 |
| 7,499,998 | B2 | * | 3/2009 | Toebes et al. | 709/225 |
| 7,523,191 | B1 | * | 4/2009 | Thomas et al. | 709/224 |
| 7,788,341 | B1 | * | 8/2010 | Burns | 709/219 |
| 7,962,603 | B1 | * | 6/2011 | Morimoto | 709/224 |
| 2002/0099818 | A1 | * | 7/2002 | Russell et al. | 709/224 |
| 2003/0149581 | A1 | | 8/2003 | Chaudhri et al. | |
| 2004/0019518 | A1 | | 1/2004 | Abraham et al. | |
| 2007/0016672 | A1 | * | 1/2007 | Wilson et al. | 709/224 |

OTHER PUBLICATIONS

NPL, Feb. 11, 2005.*
"onLoad Event handlers", 1 page, retrieved on Feb. 4, 2014 from the Internet: <URL: http://www.javascriptkit.com/javatutors/event3.shtml>.
"JavaScript location.replace( ) method", 4 pages, retrieved on Feb. 4, 2014 from the Internet: <URL:http://roseindia.net/javascript/javascript-location-replace.shtml >.

* cited by examiner

*Primary Examiner* — Andrew Georgandellis
(74) *Attorney, Agent, or Firm* — Schmeiser, Olsen & Watts, LLP; Arthur J. Samodovitz

(57) ABSTRACT

A method, system and program product for collecting web metric data is disclosed. The method includes inserting a script at the top of each web page to be metered, sending a web page request to a web server for a web page, loading the web page while executing the script inserted within the web page for collecting web usage data without substantially increasing web page load time. The method further includes establishing an asynchronous connection to a metric server chosen for sending the web usage data collected and transmitting to the metric server the web usage data collected as part of a record request using a method such that the record request is not cached at an intermediate proxy. The method further includes contacting an alternate metric server if the metric server chosen is not available or cannot record the web usage data.

11 Claims, 7 Drawing Sheets

METHOD, SYSTEM AND PROGRAM PRODUCT FOR COLLECTING WEB METRIC DATA

FIELD OF THE INVENTION

The present invention relates to a method, system and computer program product for collecting web metric data. More particularly, the present invention relates to a method, system and computer program product for collecting web metric data over a computer network without substantially increasing the load time for a web page.

BACKGROUND OF THE INVENTION

In today's business environment, organizations and/or businesses utilize end user data from an Internet consumer's computer to determine how a product or service is being received by the end user or how a business can meet a particular need in the marketplace or to gauge any performance delivery issues that may impact decisions made by an end user. The end user data often is collected by analyzing logs of collection or monitoring servers, which then enables the collection of data pertaining to a user's Internet usage. As such, there is a need for an efficient way to collect end user data without requiring active participation by the end user or without negatively impacting the performance delivered or expected by end users.

SUMMARY OF THE INVENTION

In a first aspect of the invention, there is provided a method of collecting web usage data over a computer network. The method comprises inserting a script at the top of each web page of a plurality of web pages to be metered. The method further comprises loading a web page corresponding to a web page request received by a remote web server, for instance, by a browser application on a client computer, while executing the script inserted within the web page for collecting the web usage data without substantially increasing load time for the web page. The method further comprises establishing an asynchronous connection to a first metric server at a remote location on the network for sending a record request for recording the web usage data collected for the web page and transmitting upon establishment of the asynchronous connection to the first metric server the web usage data as part of the record request using a method such that the record request is not cached at an intermediate proxy. In an embodiment, the method further comprises receiving an acknowledgment response from the first metric server whether or not the web usage data has been successfully recorded on the first metric server. In an embodiment, the method further comprises establishing an asynchronous connection to a second or alternate metric server, if the asynchronous connection to the first metric server cannot be established of if the acknowledgment response received from the first metric server informs that the web usage data has not been successfully recorded. In an embodiment, the script provides a list of metric servers to be contacted for recording the web usage data collected. Alternatively, the method comprises contacting an arbitrary metric server from the provided list of metric servers for sending the web usage data in order to achieve load balancing.

In another aspect of the invention, there is provided a system for collecting web metrics data. The system comprises a plurality of available web servers coupled to a computer network, each of the plurality of available web servers being configured to serve one or more web pages to be metered, with each of the one or more web pages having inserted therein script at the top. Further, the system comprises a browser application running on a client computer on the computer network configured to execute the script inserted within a web page that is requested without substantially increasing load time of the web page and is configured to collect web metric data and transmit via an asynchronous connection to a metric server among a list of metric servers identified in the script a request for recording any web metric data collected for the web page to a metric server among a plurality of servers identified in the script by using a method such that the request is not cached at an intermediate proxy. In an embodiment, the system is further configured to receive an acknowledgment response from the metric server as to whether or not the web metric data transmitted has been successfully recorded on the metric server. Further, if either the acknowledgment response is not received from the metric server or if the acknowledgment response verifies that the web metric data transmitted has not been successfully recorded, in an embodiment, the system is further configured to contact an alternate metric server from the list of metric servers identified in the script for sending the web metric data collected such that an error message is not communicated on the client computer. Further, in an embodiment, the system is configured to contact an arbitrary metric server on the list of metric servers for sending the web metric data in order to achieve load balancing.

In yet another embodiment, the present invention provides a computer program product for collecting web metric data. The computer program product comprises a computer readable medium, first program instructions to insert a script at the top of each web page of a plurality of web pages to be metered for web metric data, second program instructions to execute the script for collecting the web metric data associated with a web page being loaded without substantially increasing load time for the web page, and third program instructions to transmit via an asynchronous connection a request to a metric server for recording the web metric data collected using a method such that the request is not cached at an intermediate proxy. The computer program product further comprises fourth program instructions to determine whether an acknowledgment response is received from the metric server verifying recordation of the web metric data and, if not, the fourth program instructions include instructions to contact an alternate metric server for recording the web metric data. In an embodiment, the fourth program instructions include instructions to contact an arbitrary metric server from the list of available metric servers in order to achieve load balancing. Preferably, the first, second, third and fourth program instructions are stored on the medium. In an embodiment, the metric server, any alternate or arbitrary metric server is chosen from a list of available metric servers provided in the script. In an embodiment, the script comprises a JavaScript script and the record request is transmitted across the computer network using an HTTP Internet protocol using a POST method.

BRIEF DESCRIPTION OF THE DRAWINGS

The accompanying drawings, which are incorporated in and form a part of this specification, illustrate embodiments of the invention and, together with the description, serve to explain the principles of the invention.

BEST MODE FOR CARRYING OUT THE INVENTION

Figure 1:
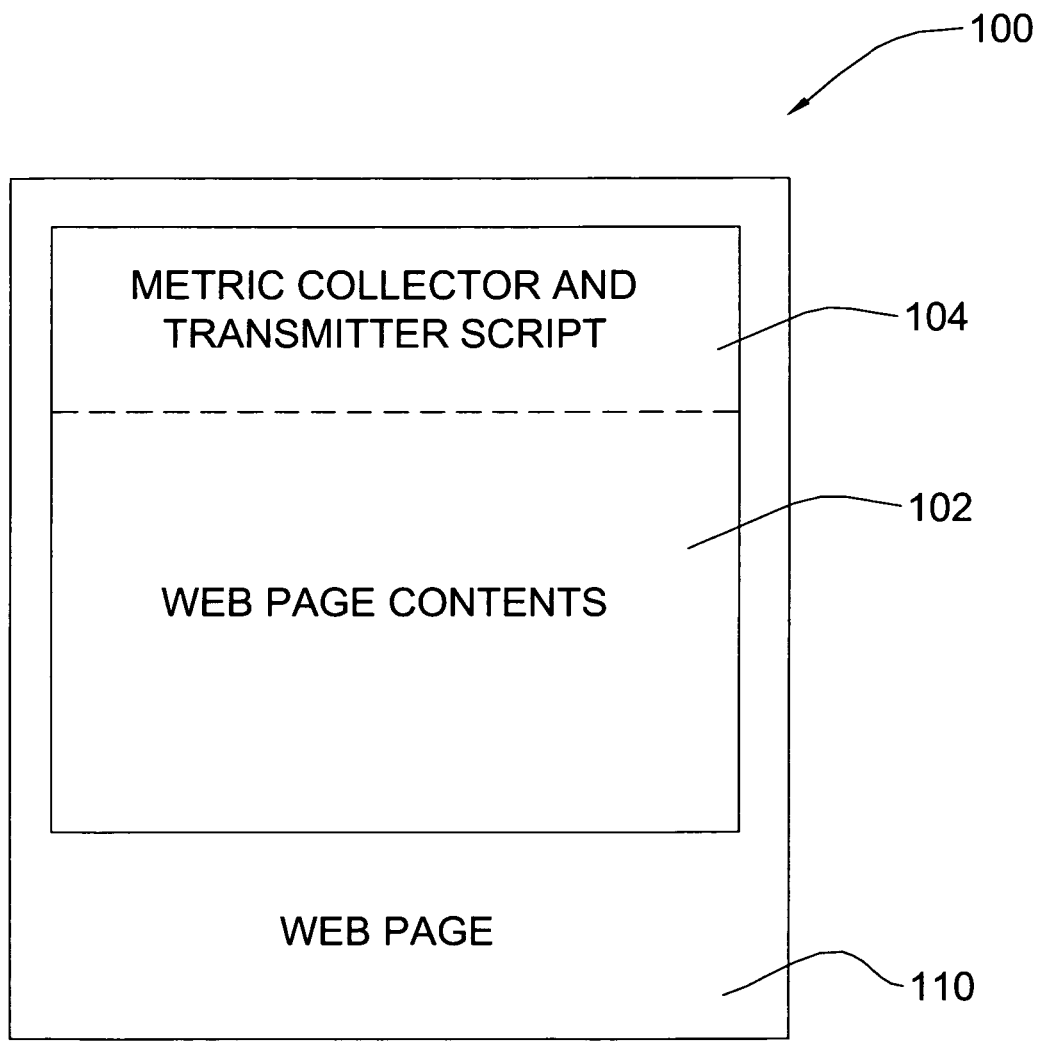
FIG. 1 represents a web page to be metered that has inserted into it a script for collecting and transmitting any measurement data collected, in accordance with an embodiment of the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module or component of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Further, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, over disparate memory devices, and may exist, at least partially, merely as electronic signals on a system or network.

Furthermore, modules may also be implemented as a combination of software and one or more hardware devices. For instance, a module may be embodied in the combination of a software executable code stored on a memory device. In a further example, a module may be the combination of a processor that operates on a set of operational data. Still further, a module may be implemented in the combination of an electronic signal communicated via transmission circuitry.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Moreover, the described features, structures, or characteristics of the invention may be combined in any suitable manner in one or more embodiments. It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents. Reference will now be made in detail to the preferred embodiments of the invention.

Figure 2:
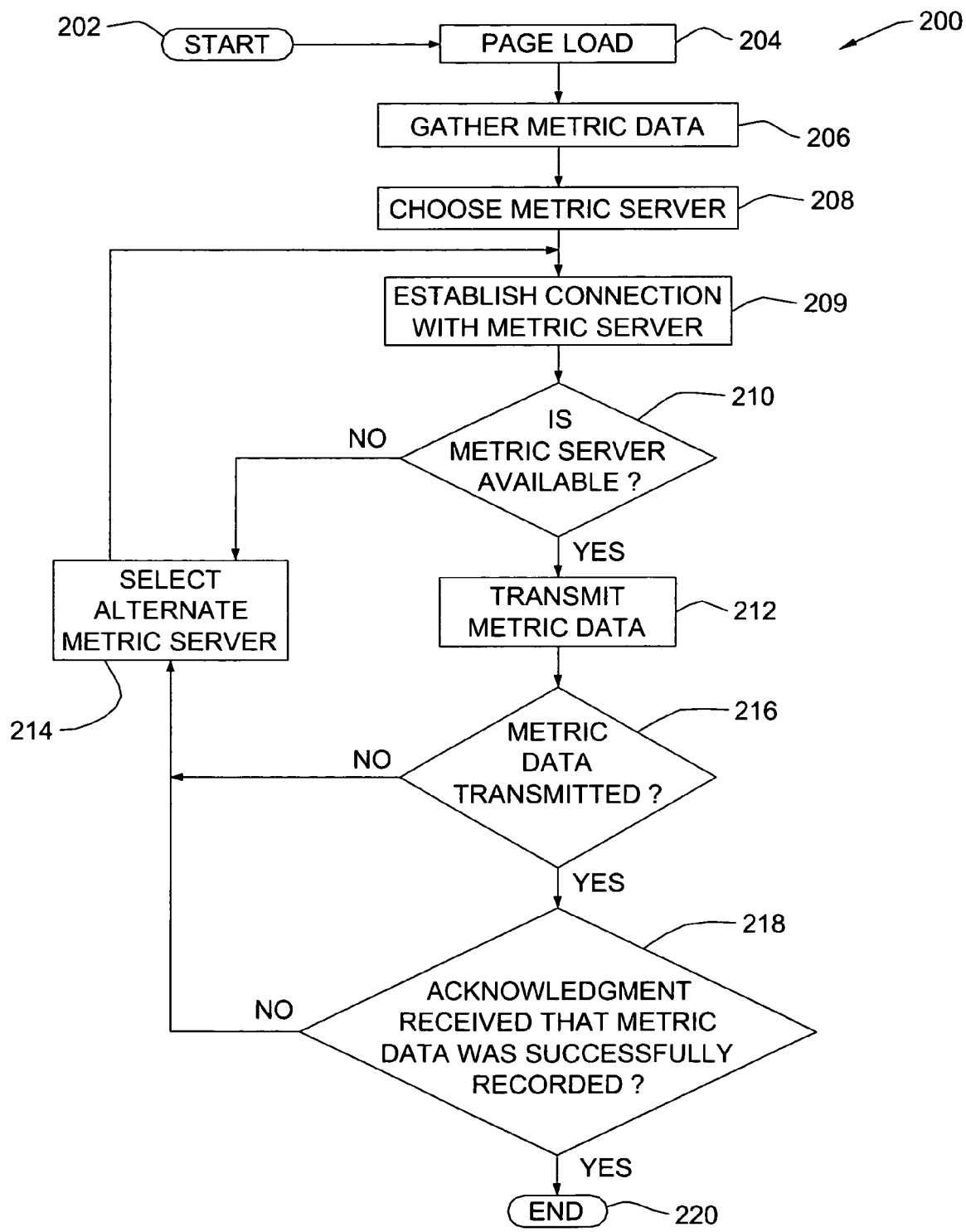
FIG. 2 is a flowchart depicting a method of collecting web usage data over a computer network, in accordance with an embodiment of the present invention.
Figure 3:
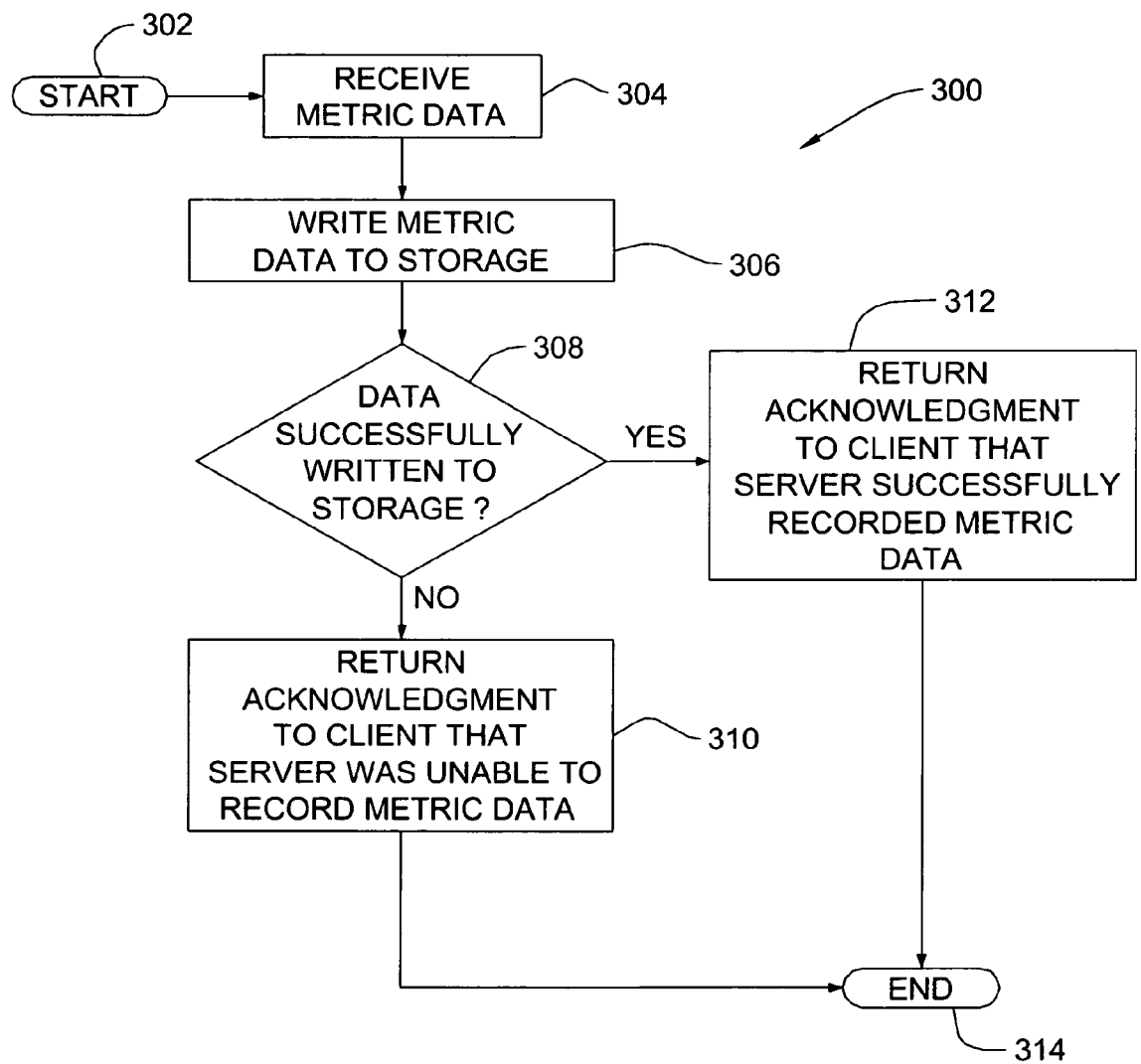
FIG. 3 is a flowchart depicting a method of collecting web usage data over a computer network, in accordance with an embodiment of the present invention.

Reference is now made to FIGS. 1 through 3, which illustrate a method of collecting web usage or web metric data over a computer network. Turning to FIG. 1, numeral 100 shows an embodiment of a web page 110, according to the present invention, which includes web page contents 102. Further, the web page 110 includes a metric collector and transmitter script 104 (also, referred to hereinafter as "script"). In particular, the metric collector and transmitter script 104 is inserted or added at the beginning of the web page contents of each and every web page that is to be metered, that is, where end user web usage data is to be measured and collected. In an embodiment, the script 104 comprises a JavaScript script. Further, the metric or web usage data collected can comprise one or more of the following data, for instance, page views, unique users, concurrent unique users, user time on site, etc. Turning to FIG. 2, reference numeral 200 depicts a method for collecting web usage or web metric data in an infrastructure where the various clients and servers are connected via a network communications channel, for instance, the Internet, such that, the clients and servers can be remotely located. The method starts at step 202, when a client requests a web page, the web page request is sent or communicated transparently by the client's web browser via the network communications channel to a web server, which may be remotely located. The web server serves the web page over the network communications channel. The web page, which includes the metric collector and transmitter script at the beginning of the web page contents is received by the client's web browser (also, referred to hereinafter as "client browser" or "web browser"). The client browser loads the web page containing the script in step 204, which launches the execution of the script inserted within the web page. In an embodiment, the script comprises a JavaScript script. Further, the script provides a list of metric servers or measurement servers that can record the web metric data that is collected by a client browser. In an embodiment, the measurement servers are servers that are configured to exclusively record web usage data. In a preferred embodiment, the script sets forth in a preferential order a list of the measurement servers in the order in which the measurement servers should be contacted for recording any web metric data that is collected by a client browser. The script, which is executed by the client browser directs the client browser to gather or collect metric or end user web usage data in step 206 without substantially increasing the load time of the web page requested, as explained herein below. When the script is executed, the client browser chooses a metric server in step 208 that is, in one embodiment, at the top of the list of measurement servers and initiates or establishes a in step 209 to a metric server that is chosen or selected so that any web metric data collected can be sent to that metric server for recordation. In particular, the connection to the metric server occurs after the web page has been loaded and not while the web page is being loaded, so that the load time of the web page is not substantially increased given that the length of time it takes to make a connection to a metric server may be impacted by a user's network speed and latency, among other factors. In an embodiment, the client browser establishes a connection, preferably, an asynchronous connection to the metric server chosen after the web page has been loaded and determines whether or not the metric server chosen is available in step 210. If the metric server chosen is available, then upon establishing an asynchronous connection, the client browser transmits in step 212 the metric data collected for the web page that was requested via a record request to the metric server chosen. Further, the record request uses a method such that the record request or response is not cached at an intermediate proxy. In an embodiment, the record request is transmitted across the computer network using an HTTP Internet protocol, where, preferably, the method for the record request comprises a POST method. In present intermediate proxy implementations, POST requests are rarely cached as they generally comprise unique transactional data. In addition, the HTTP header and value, "Cache-Control: no-cache" is transmitted with every request to instruct intermediate proxies not to cache any part of the request or response. Referring back to step 210 of FIG. 2, if, on the other hand, the chosen metric server is not available, for instance, the connection could not be established, then the client browser selects an alternate or a second metric server in step 214 from the list of metric servers provided by the script. In an embodiment, the client browser is directed to choose the alternate or the second metric server that is next in priority order on the list of metric servers, but not necessarily the second metric server listed on the list of metric servers. In another embodiment, the client browser is directed to choose an arbitrary metric server from the list of metric servers in order to achieve load balancing, for instance, if a metric server is busy recording web usage data. Accordingly, after choosing the alternate metric server in step 214, the client browser establishes an asynchronous connection in step 210 with the alternate metric server chosen and determines in step 210 whether or not the alternate metric server chosen is available. If the alternate metric server chosen is available, then upon establishing an asynchronous connection, the client browser transmits in step 212 the metric data collected for the web page that was requested via a record request to the alternate metric server chosen, using a method such that the record request or response is not cached at an intermediate proxy. Furthermore, in step 216, a determination is made as to whether or not the metric data has been transmitted successfully to the chosen metric server. If the metric data was transmitted successfully, the client browser makes a determination in step 218 as to whether an acknowledgment response was received from the metric server informing that the metric data was successfully recorded. If the metric data has not been transmitted successfully to the chosen metric server in step 216 and/or if an acknowledgement is not received from the chosen metric server that the metric data was successfully recorded, then the client browser selects in step 214 an alternate metric server that is preferably on the list of metric servers provided by the script. Steps 210, 212, 216, 218 and 214 are repeated, as necessary, until the client browser establishes a connection to a metric server chosen from the list of metric servers provided in the script, such that, the client browser is in receipt of acknowledgment from the chosen metric server that the web metric data collected and transmitted has been successfully recorded on the chosen metric server, thus, ending the process at step 220.

Turning to FIG. 3, reference numeral 300 outlines the steps taken by a chosen metric server to whom metric data has been transmitted. In particular, the process starts at step 302, when the chosen metric server receives in step 304 the metric data that has been collected and transmitted by the client browser. The metric server writes in step 306 the metric data to a storage location on the metric server. The metric server determines in step 308 whether or not the metric data received has been successfully written to the storage location on the metric server. If the metric data received has been successfully written to the storage location on the metric server in step 308, then the metric server returns or sends an acknowledgment in step 312 to the client browser that server the metric server has successfully recorded the metric data, which ends the process at step 314. On the other hand if the metric data received has not been successfully written to the storage location on the metric server in step 308, then the metric server returns or sends in step 310 an acknowledgment to the client browser that the metric server was unable to record or has not successfully recorded the metric data received, which ends the process at step 314.

Figure 4:
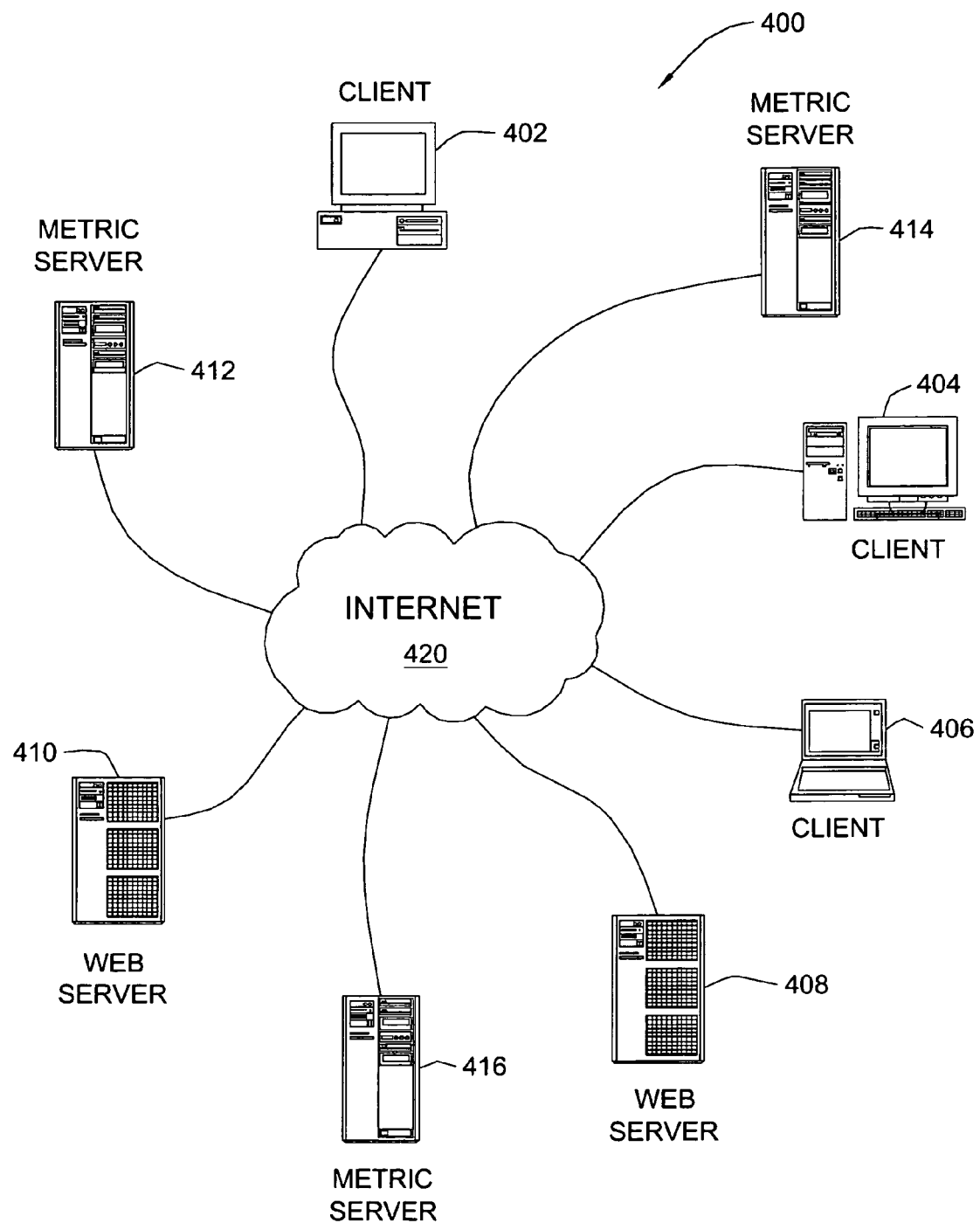
FIG. 4 is a schematic block diagram illustrating a system for collecting web metric data, in accordance with an embodiment of the present invention.

In another embodiment, the present invention provides a system for collecting web metric data. Reference is now made to FIGS. 4-7, which illustrate different embodiments of a system for collecting web metric data, in accordance with the invention. Turning to FIG. 4, reference number 400 refers to a system for collecting web metric data over a network. As shown in one embodiment in FIG. 4, the web metric data collection system 400 comprises a network communications channel 420, where a plurality of clients and servers are connected to the network communications channel 420, for instance, the Internet, which serves as a communications channel for the various components of the system. Further, the system 400 shown in FIG. 4 is similar to a local area network (LAN) and includes several clients, several web servers and several metric servers, all of these clients and servers being connected via the communications channel 420. The communications channel 420 may be, in one embodiment, an Ethernet communications channel, a wireless communications channel, or another equivalent communications channel. Although the depicted networked computing infrastructure 400 is shown to include three clients, 402, 404 and 406, two web servers, 408 and 410, three metric servers, 412, 414 and 416, the networked infrastructure 400 may comprise a combination of various network configurations having fewer or more clients, web servers and/or metric servers as well as alternate client-server configurations. Preferably, the clients systems are configured to request one or more web pages. Further, the web servers are configured to serve one or more web pages to be metered, each of the one or more web pages having inserted therein script at the top as shown in FIG. 1. Further, each of the clients 402, 404 and 406 in the network system 400 comprises a browser application running on the client (not shown in FIG. 4) that is configured to execute the script within a web page that is requested by establishing connection with a metric server after the web page has been loaded such that the web page load time is not substantially increased and is configured to transmit a request for recording any web metric data collected for the web page to a metric server identified in the list of metric servers provided by the script by using a method such that the request is not cached at an intermediate proxy, as described further with respect to FIGS. 4 and 5.

Figure 5:
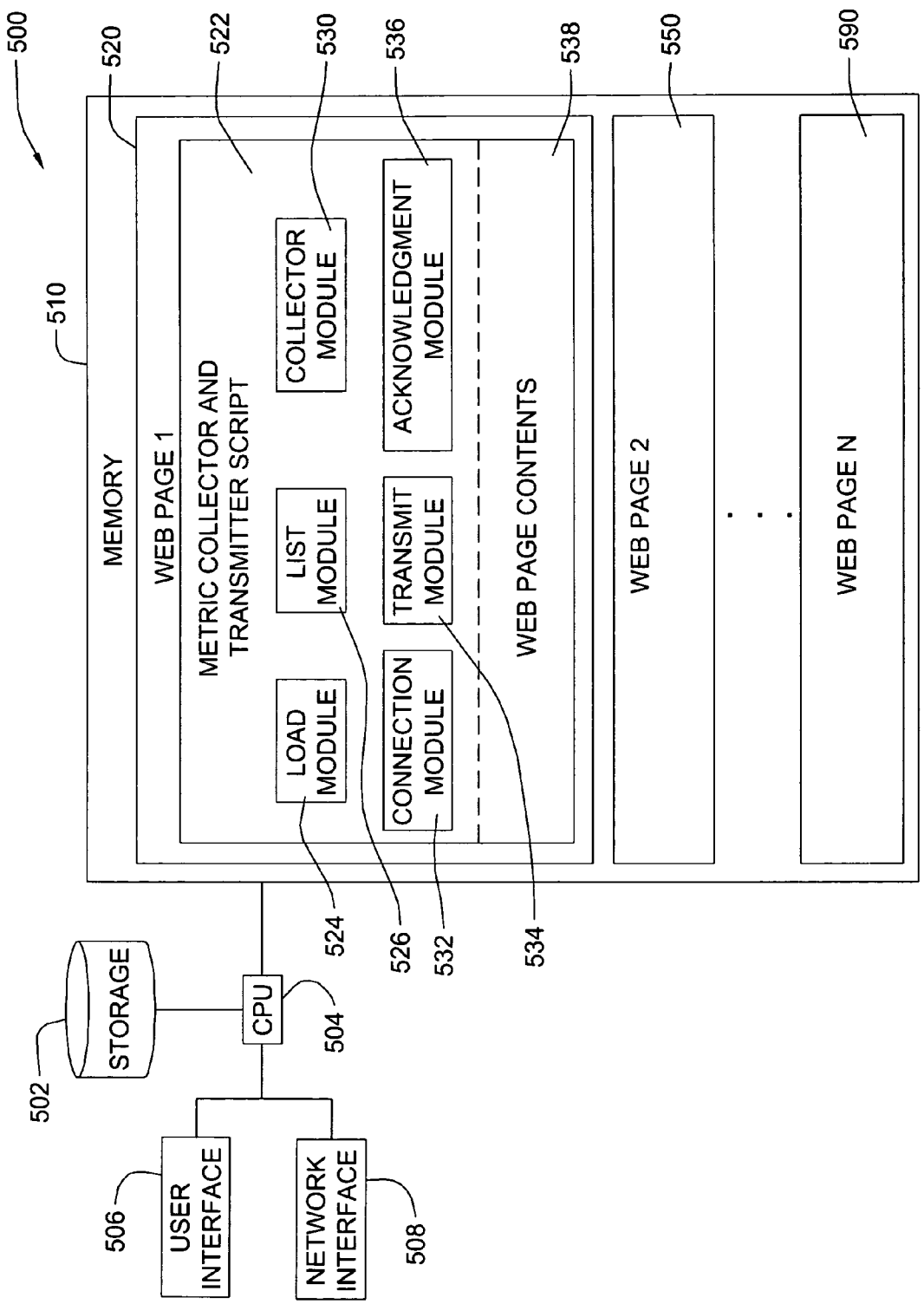
FIG. 5 is a schematic block system diagram illustrating a web server configured to serve web pages to be metered, in accordance with an embodiment of the present invention.

Turning to FIG. 5, FIG. 5 shows an embodiment of a web server 500 configured to serve one or more web pages stored on the web server 500, in accordance with the invention. Preferably, the web server 500 includes a central processing unit (CPU) 504, a local storage device 502, a user interface 506, a network interface 508, and a memory 510. The CPU 504 is configured generally to execute operations within the web server 500. The user interface 506, in one embodiment, is configured to allow a user to interact with the web server 500, including allowing input data and commands from a user and communicating output data to the user. The network interface 508 is configured, in one embodiment, to facilitate network communications of the web server 500 over the communications channel 420 of the network 400. The local memory 510 is configured, in one embodiment, to store one or more web pages, for instance, web page 1 (reference numeral 520), web page 2 (reference numeral 550), up to web page N (reference numeral 590, etc. In particular, as shown in FIG. 5, the metric collector and transmitter script 522 is inserted at the beginning of each web page's contents 538. For instance, when a client browser is served the web page 520, the client browser executes the metric collector and transmitter script 522 while loading the contents 538 of the web page 520. In an alternative embodiment, some or all of these web pages may be replicated in the local storage device 502. In a further embodiment, one or all of these web pages may be stored exclusively in the local storage device 502 rather than in the memory 510. In another embodiment, one or all of these web pages may be stored in distributed storage on other web servers on the network 400.

Further, as shown in FIG. 5, the metric collector and transmitter script 522 is inserted at the beginning of the web page contents 538 of each of the web pages 520, 550 and 590 stored on the web server. In an embodiment, the script comprises a JavaScript script. In one embodiment, as shown in FIG. 5, the metric collector and transmitter script 522 implemented within each web page 520, 550 and 590 on the web server 500 comprises a logic unit that contains a plurality of modules configured to functionally execute the necessary steps of collecting web usage data collected for a corresponding page within which the metric collector and transmitter script is implemented and transmitting the web usage date collected to a metric server over a network. In particular, the metric collector and transmitter script 522 includes a load module 524, a list module 526, a collector module 530, a connection module 532, a transmit module 534, and an acknowledgment module 536. The load module 204 of the metric collector and transmitter script 522 inserted within each web page is configured to process a web page request for loading a web page on a client without substantially increasing the load time of the web page. Also, the list module 530 of the metric collector and transmitter script 522 is configured to provide a list of metric servers to be contacted for recording web usage data pertaining to the web page. Further, the collector module 530 is configured to provide web usage data parameters in order to gather or collect web metric data for the corresponding web page. The connection module 532 is configured to establish an asynchronous connection to a metric server chosen from the list of metric servers after the web page has been loaded. The transmit module 534 is configured to transmit to a metric server chosen, upon establishing connection, a record request for recording the web usage data collected, such that the collected web metric data that is transmitted is not cached at an intermediate proxy. The acknowledgment module 536 is configured to check whether or not the web usage data pertaining to the corresponding web page has been transmitted to the metric server chosen and to receive an acknowledgment response from the chosen metric server to which the web metric data was transmitted that the metric data was successfully recorded on the chosen metric server. Further, if an acknowledgment is not received from the metric server or if the acknowledgment verifies that the web metric data transmitted has not been successfully recorded, in an embodiment, the connection module 532 is further configured to contact an alternate metric server from a list of metric servers identified in the list module 526 for sending the web metric data collected such that an error message is not communicated on the client computer. Furthermore, for load balancing, the connection module 532 is further configured to contact an arbitrary metric server from the list of metric servers identified in the list module 526 for sending the web metric data collected. As mentioned hereinabove, in an embodiment, the request is transmitted across the network using an HTTP Internet protocol, which utilizes a POST method, such that the request is not cached at an intermediate proxy.

Figure 6:
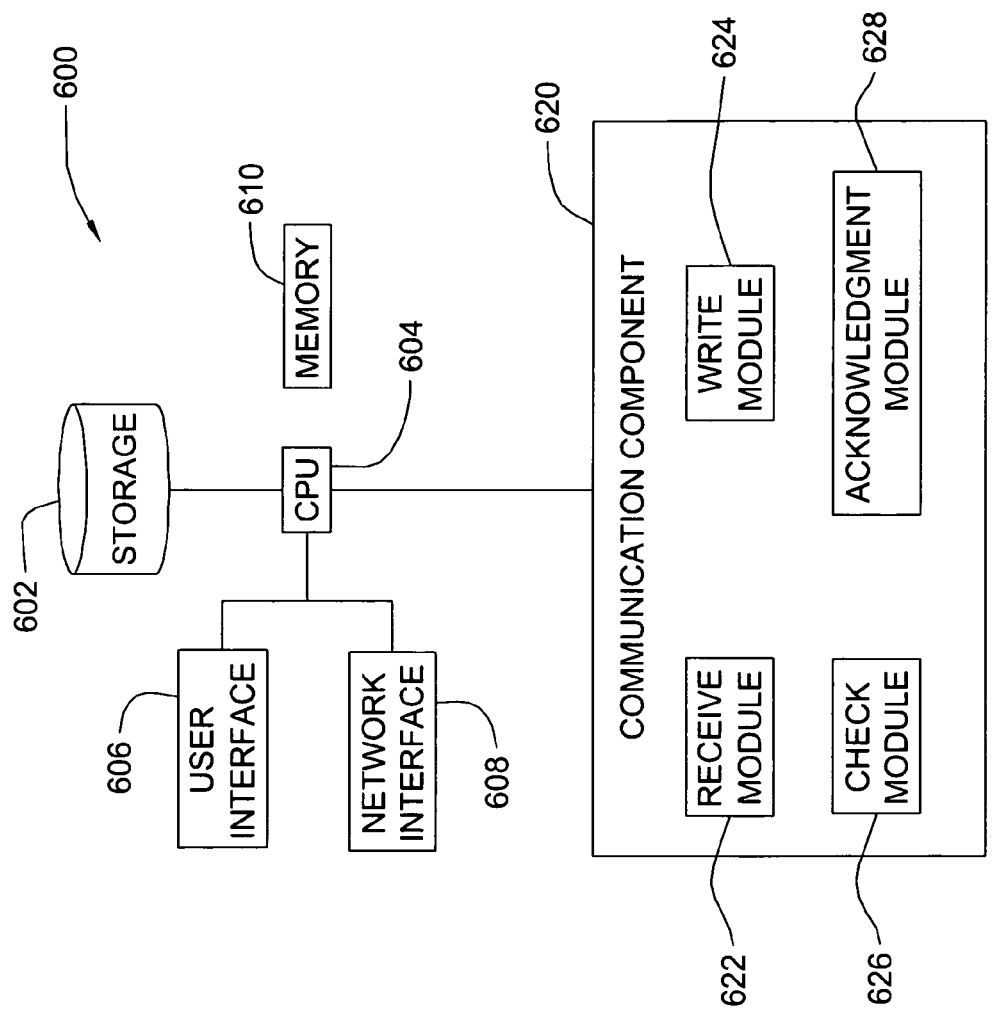
FIG. 6 is a schematic block system diagram illustrating a metric server configured to record web metric data collected for a web page, in accordance with an embodiment of the present invention.

Turning to FIG. 6, FIG. 6 shows an embodiment of a metric server 600 that is configured to record web usage data gathered or collected for a web page, in accordance with an embodiment of the invention. Preferably, the web server 600 includes a central processing unit (CPU) 604, a local storage device 602, a user interface 606, a network interface 608, and a memory 610. The CPU 604 is configured generally to execute operations within the web server 600. The user interface 606, in one embodiment, is configured to allow a user to interact with the web server 600, including allowing input data and commands from a user and communicating output data to the user. The network interface 608 is configured, in one embodiment, to facilitate network communications of the web server 600 over the communications channel 420 of the network 400. The local memory 610 is configured, in one embodiment, to store several data and metadata files that may be used in conjunction with a web usage data collection operation. In an alternative embodiment, some or all of these data and metadata files may be replicated in the local storage device 602. In a further embodiment, one or all of these data and metadata files may be stored exclusively in the local storage device 602 rather than in the memory 610. In another embodiment, one or all of these data and metadata files may be stored in distributed storage on the network system 400. Although the present description refers to "files," the present invention is understood to operate in substantially the same manner using other electronic memory and storage structures. Reference herein to a data file or metadata file is understood to equivalently refer to other such electronic memory and storage structures.

Further, in one embodiment, the metric server 600 preferably comprises a communication component 620 that comprises several modules, including a receive module 622, a write module 624, a check module 626 and an acknowledgment module 628. The communication component of the metric server 600 is provided with a logic unit containing a plurality of modules configured to functionally execute the necessary steps of communicating to the client browser of a client whether or not the metric server was able to record the metric data that was received by the metric server 600 over the network, so that the client browser can take alternative steps to record the metric data collected. In particular, the receive module 622 of the communication component 620 of the metric server 600 is configured to receive the metric data transmitted by a client browser of a client that has requested a web page. The write module 624 is configured to write the metric data received from the client browser to storage, for instance, on a disk on the local storage device 602. Alternatively, the metric data received from the client browser may be stored in the memory 610. Further, the check module 626 is configured to check whether or not the metric data was successfully written to storage. Moreover, the acknowledgment module 628 is configured to send or return an acknowledgment to the client browser of the client as to whether or not the metric server 600 was able to record the metric data that was received by the metric server 600.

In yet another embodiment, the present invention provides a computer program product for collecting web metric data. The computer program product comprises a computer readable or computer-usable medium, which provides program code for use by or in connection with a computer or any instruction execution system. For the purposes of this description, a computer-usable or computer readable medium can be any apparatus that can contain, store, communicate, or transport the program for use by or in connection with the instruction execution system, apparatus, or device. Preferably, the computer storage medium can be an electronic, magnetic, optical, electromagnetic, infrared, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. Further, preferably, network medium can comprise of transmission devices on a network, such as, cables, routers, switches and/or network adapter cards.

Preferably, the computer program product is in a form accessible from the computer-usable or computer-readable medium, which provides program codes or instructions for use by or in connection with a computer or any instruction execution system. For the purposes of this description, a computer-usable or computer readable medium can be any apparatus that can contain, store, communicate, or transport the codes or instructions for use by or in connection with the instruction execution system, apparatus, or device. Preferably, the medium can comprise an electronic, magnetic, optical, electromagnetic, infrared, or semiconductor system (or apparatus or device). More preferably, the computer-readable medium can comprise a semiconductor or solid state memory, magnetic tape, a removable computer diskette, a random access memory (RAM), a read-only memory (ROM), a rigid magnetic disk and an optical disk. Further, examples of optical disks include compact disc-read only memory (CD-ROM), compact disc-read/write (CD-R/W) and digital versatile/video disc (DVD). The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Preferably, the computer program product is in a form accessible from the computer-usable or computer-readable medium, which provides program codes or instructions for use by or in connection with a computer or any instruction execution system. For the purposes of this description, a computer-usable or computer readable medium can be any apparatus that can contain, store, communicate, propagate, or transport the codes or instructions for use by or in connection with the instruction execution system, apparatus, or device. Preferably, the medium can comprise an electronic, magnetic, optical, electromagnetic, infrared, or semiconductor system (or apparatus or device) or a propagation medium. More preferably, the computer-readable medium can comprise a semiconductor or solid state memory, magnetic tape, a removable computer diskette, a random access memory (RAM), a read-only memory (ROM), a rigid magnetic disk and an optical disk. Further, examples of optical disks include compact disc-read only memory (CD-ROM), compact disc-read/write (CD-R/W) and digital versatile/video disc (DVD). The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

In an embodiment, the computer program product includes first program instructions to insert a script at the top of each web page of a plurality of web pages to be metered for web metric data, second program instructions to execute the script for collecting the web metric data associated with a web page of the plurality of web pages being loaded without substantially increasing load time for the web page and third program instructions to transmit a request to a metric server for recording the web metric data collected using a method such that the request is not cached at an intermediate proxy. In an embodiment, the third program instructions include instructions to establish an asynchronous connection to the metric server, after the web page has been loaded, for sending the request for recording the web metric data collected. The computer program product further comprises fourth program instructions to determine whether an acknowledgment response is received from the metric server verifying recordation of the web metric data and, if not, the fourth program instructions include instructions to contact an alternate or backup metric server for recording the web metric data. Further, in an embodiment, the fourth program instructions include instructions to contact an arbitrary metric server from the list of available metric servers in order to achieve load balancing. In an embodiment, the metric server, the alternate or backup metric server and the arbitrary server is chosen from a list of available metric servers provided in the script. Preferably, each of the first, second, third and fourth program instructions are stored on the computer readable medium. Further, in an embodiment, the script comprises a JavaScript script and the request is transmitted across the computer network using an HTTP Internet protocol. Further, the method for the record request comprises a POST method.

Figure 7:
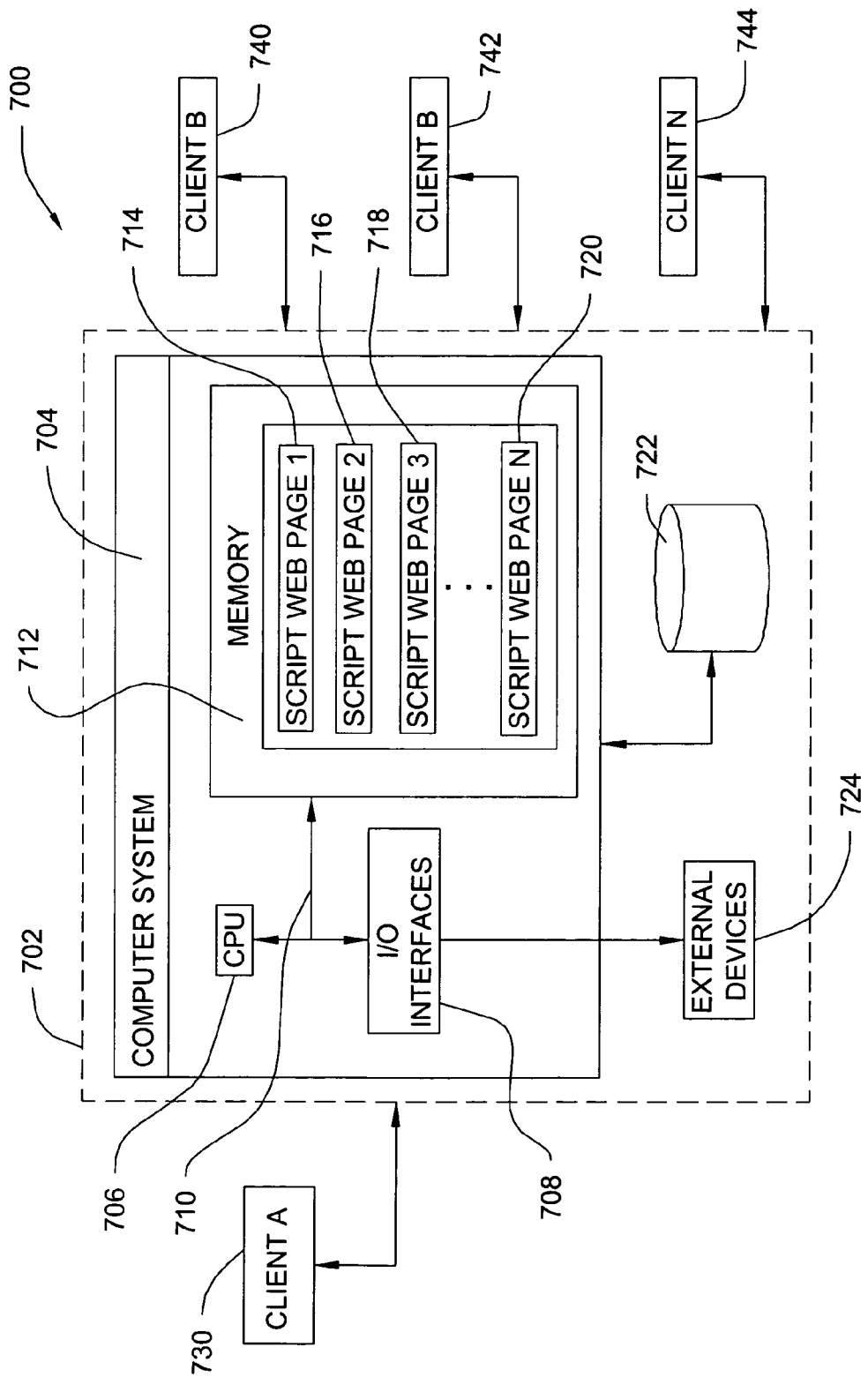
FIG. 7 is a schematic block system diagram illustrating a computer system having a computer program product for collecting web metric data, in accordance with an embodiment of the present invention.

Referring now to FIG. 7, there is illustrated a system 700 for collecting web usage data pertaining to a web page which has the metric collector and transmitter script inserted therein, according to the present invention. As depicted, system 700 includes a computer infrastructure 702, which is intended to represent any type of computer architecture that is maintained in a secure environment (i.e., for which access control is enforced). As shown, infrastructure 702 includes a computer system 704 that typically represents a web server or the like. It should be understood, however, that although not shown, other hardware and software components (e.g., additional computer systems, such as, metric servers, administrative servers, routers, firewalls, etc.) could be included in infrastructure 702.

In general, a client A 730 interfaces with infrastructure 702 to obtain a web page. Similarly, one or more clients B, C and D (designated by numerals 740, 742 and 744) can interface with infrastructure 702 to obtain a web page. To this extent, infrastructure 702 provides a secure environment. In general, the parties could access infrastructure 702 directly, or over a network via interfaces (e.g., client web browsers) loaded on computerized devices (e.g., personal computers, laptops, handheld devices, etc. not shown in FIG. 7). In the case of the latter, the network can be any type of network such as the Internet, a local area network (LAN), a wide area network (WAN), a virtual private network (VPN), etc. In any event, communication with infrastructure 702 could occur via a direct hardwired connection (e.g., serial port), or via an addressable connection that may utilize any combination of wire line and/or wireless transmission methods. Moreover, conventional network connectivity, such as Token Ring, Ethernet, WiFi or other conventional communications standards could be used. Still yet, connectivity could be provided by conventional TCP/IP sockets-based protocol. In this instance, the parties could utilize an Internet service provider to establish connectivity to infrastructure 702. It should be understood that under the present invention, infrastructure 702 could be owned and/or operated by a party such as provider 730, or by an independent entity. Regardless, use of infrastructure 702 and the teachings described herein could be offered to the parties on a subscription or fee-basis. In either scenario, an administrator at an administrative server or any other designated computer system (not shown in FIG. 7) could support and configure infrastructure 702.

Computer system 704 is shown to include a CPU (hereinafter "processing unit 706"), a memory 712, a bus 710, and input/output (I/O) interfaces 708. Further, computer system 700 is shown in communication with external I/O devices/resources 724 and storage system 722. In general, processing unit 706 executes computer program codes, such as the metric collector and transmitter script inserted within the web page 714 that is stored in memory 710 and/or storage system 722. Similarly, processing unit 706 executes the computer program code for the metric collector and transmitter script inserted within each of the other web pages 716, 718 and 720. While executing the metric collector and transmitter script, the processing unit 706 can read and/or write data, to/from memory 712, storage system 722, and/or I/O interfaces 708. Bus 710 provides a communication link between each of the components in computer system 700. External devices 724 can comprise any devices (e.g., keyboard, pointing device, display, etc.) that enable a user to interact with computer system 700 and/or any devices (e.g., network card, modem, etc.) that enable computer system 700 to communicate with one or more other computing devices.

Computer infrastructure 702 is only illustrative of various types of computer infrastructures for implementing the invention. For example, in one embodiment, computer infrastructure 702 comprises two or more computing devices (e.g., a server cluster) that communicate over a network to perform the various process steps of the invention. Moreover, computer system 700 is only representative of various possible computer systems that can include numerous combinations of hardware. To this extent, in other embodiments, computer system 700 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively. Moreover, processing unit 706 may comprise a single processing unit, or be distributed across one or more processing units in one or more locations, e.g., on a client and server. Similarly, memory 712 and/or storage system 722 can comprise any combination of various types of data storage and/or transmission media that reside at one or more physical locations. Further, I/O interfaces 708 can comprise any system for exchanging information with one or more external devices 724. Still further, it is understood that one or more additional components (e.g., system software, math co-processing unit, etc.) not shown in FIG. 7 can be included in computer system 700. However, if computer system 700 comprises a handheld device or the like, it is understood that one or more external devices 724 (e.g., a display) and/or storage system(s) 722 could be contained within computer system 700, not externally as shown.

Storage system 722 can be any type of system (e.g., a database) capable of providing storage for information under the present invention. To this extent, storage system 722 could include one or more storage devices, such as a magnetic disk drive or an optical disk drive. In another embodiment, storage system 722 includes data distributed across, for example, a local area network (LAN), wide area network (WAN) or a storage area network (SAN) (not shown). Although not shown, additional components, such as cache memory, communication systems, system software, etc., may be incorporated into computer system 700.

The foregoing descriptions of specific embodiments of the present invention have been presented for the purpose of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method of collecting web usage data over a computer network, said method comprising the steps of:
   inserting a script at the top of each web page of a plurality of web pages to be metered, wherein said script identifies a list of metric servers to be contacted in a priority order for recording web usage data collected, and wherein said inserting said script step consists essentially of inserting said script at the beginning of said each web page of said plurality of web pages to be metered;
   sending a web page request over a computer network to a web server for a web page of said plurality of web pages;
   loading said web page while executing said script inserted within said web page for collecting said web usage data without substantially increasing load time for said web page;
   after said web page is loaded, selecting a metric server from said list of metric servers according to said priority order provided in said script;
   for each metric server selected from said list of metric servers:
      attempting to establish a connection to the selected metric server;
      if the attempt to establish the connection with the selected metric server is determined to be unsuccessful, selecting another metric server from said list of metric servers according to said priority order provided in said script;
      if the attempt to establish the connection to the selected metric server is determined to be successful, determining whether the selected metric server is currently busy recording other web usage data;
      if the selected metric server is determined to not be currently busy recording other web usage data, sending a record request to the selected metric server to record said web usage data collected for said web page;
      if the selected metric server is determined to be currently busy recording other web usage data, arbitrarily selecting another metric server from the list of metric servers.

2. The method according to claim 1, further comprising the step of:
  after said sending the record request to the selected metric server, receiving an acknowledgment response from said selected metric server whether or not said web usage data has been successfully recorded on said selected metric server.

3. The method according to claim 2, further comprising the steps of:
  determining that said acknowledgment response received from said selected metric server informs that said web usage data has not been successfully recorded, and in response, selecting another metric server that is next in said priority order on said list of metric servers.

4. The method according to claim 1, wherein said script comprises a JavaScript script.

5. The method according to claim 1, wherein said record request is transmitted across said computer network using an HTTP Internet protocol, and wherein said method for said record request comprises a POST method.

6. A method of collecting usage data over a computer network, said the method comprising the steps of:
  a client computer loading a part of a web page containing a script program, and concurrently executing the script program while loading a remainder of the web page, the script program identifying a list of metric servers to be contacted in a specified priority order to record usage data comprising a time usage of the web page at the client computer, the usage data being collected by the client computer;
  after the entire web page is loaded at the client computer, the client computer selecting a metric server listed in the list of metric servers according to the priority order provided in the script program;
  for each metric server selected from said list of metric servers:
    the client computer attempting to establish a connection to the selected metric server;
    if the attempt to establish the connection with the selected metric server is determined to be unsuccessful, the client computer selecting another metric server from said list of metric servers according to said priority order provided in said script;
    if the attempt to establish the connection to the selected metric server is determined to be successful, the client computer determining whether the selected metric server is currently busy recording other web usage dta;
    if the selected metric server is determined to not be currently busy recording other web usage data, the client computer sending a record request to the selected metric server to record said web usage data collected for said web page;
    if the selected metric server is determined to be currently busy recording other web usage data, the client computer arbitrarily selecting another metric server from the list of metric servers.

7. The method of claim 6, wherein the attempting to establish the connection comprises attempting to establish an asynchronous connection to the selected metric server.

8. The method of claim 6, wherein the usage data further comprises a list of concurrent unique users of the web page.

9. A computer program product for collecting usage data over a computer network, the computer program product comprising: one or more computer readable storage devices and program instructions stored on at least one of the one or more storage devices, the program instructions comprising:
  program instructions to load, by a client computer, a part of a web page containing a script program, and to concurrently execute the script program by the client computer while a remainder of the web page is being loaded, the script program identifying a list of metric servers to be contacted in a specified order to record usage data comprising a time usage of the web page at the client computer, the usage data being collected by the client computer;
  program instructions to select, by the client computer after the entire web page is loaded at the client computer, a metric server listed in the list of metric servers according to the priority order provided in the script program;
  program instructions, to be executed for each metric server selected from said list of metric servers, comprising:
    program instructions to attempt, by the client computer, to establish a connection to the selected metric server;
    program instructions to select, by the client computer if the attempt to establish the connection with the selected metric server is determined to be unsuccessful, another metric server from said list of metric servers according to said priority order provided in said script;
    program instructions to determine, by the client computer if the attempt to establish the connection to the selected metric server is determined to be successful, whether the selected metric server is currently busy recording other web usage data;
    program instructions to send, by the client computer if the selected metric server is determined to not be currently busy recording other web usage data, a record request to the selected metric server to record said web usage data collected for said web page;
    program instructions to arbitrarily select, by the client computer if the selected metric server is determined to be currently busy recording other web usage data, another metric server from the list of metric servers.

10. The computer program product of claim 9, wherein the program instructions to attempt to establish the connection to the selected metric server comprises program instructions to attempt to establish an asynchronous connection to the selected metric server.

11. The computer program product of claim 9, wherein the usage data further comprises a list of concurrent unique users of the web page.

* * * * *